United States Patent
Phillips et al.

(10) Patent No.: US 9,329,287 B2
(45) Date of Patent: May 3, 2016

(54) METHOD OF SEISMIC SOURCE INDEPENDENT OPERATION

(71) Applicant: INOVA, LTD., Grand Cayman (KY)

(72) Inventors: Thomas Phillips, Richmond, TX (US); Keith Radcliffe, Meadows Place, TX (US); Bernard Maechler, Sugar Land, TX (US); Igor Samoylov, Stafford, TX (US)

(73) Assignee: INOVA, LTD., Houston, TX (US)

( * ) Notice: Subject to any disclaimer, the term of this patent is extended or adjusted under 35 U.S.C. 154(b) by 535 days.

(21) Appl. No.: 13/763,362

(22) Filed: Feb. 8, 2013

(65) Prior Publication Data

US 2013/0201788 A1  Aug. 8, 2013

Related U.S. Application Data

(60) Provisional application No. 61/596,660, filed on Feb. 8, 2012.

(51) Int. Cl.
*G01V 1/04* (2006.01)
*G01V 1/00* (2006.01)

(52) U.S. Cl.
CPC *G01V 1/04* (2013.01); *G01V 1/003* (2013.01); *G01V 2200/12* (2013.01)

(58) Field of Classification Search
CPC ...... G01V 1/04; G01V 1/003; G01V 2200/12
USPC .......................................................... 367/14
See application file for complete search history.

(56) References Cited

U.S. PATENT DOCUMENTS

| | | | |
|---|---|---|---|
| 6,633,800 B1 | 10/2003 | Ward et al. | |
| 8,000,168 B2 | 8/2011 | Eick et al. | |
| 8,094,514 B2 | 1/2012 | Tenghamn | |
| 8,205,711 B2 | 6/2012 | Hopperstad et al. | |
| 2004/0008175 A1 | 1/2004 | Elder et al. | |
| 2010/0302900 A1 | 12/2010 | Tenghamn | |
| 2011/0180346 A1 | 7/2011 | Laycock | |
| 2011/0305105 A1 | 12/2011 | Dean | |
| 2013/0170317 A1 | 7/2013 | Stork | |

FOREIGN PATENT DOCUMENTS

WO  2012100008 A2  7/2012

OTHER PUBLICATIONS

PCT/US2013/025402—International Search Report dated Apr. 26, 2013.

*Primary Examiner* — Daniel L Murphy
(74) *Attorney, Agent, or Firm* — Mossman, Kumar & Tyler, PC

(57) ABSTRACT

A method of controlling seismic data acquisition may include sending a first message to place a plurality of energy sources into an operating mode; sending a second message to place at least one of plurality of energy sources into a non-operating mode; and sending a third message from at least one energy source to a controller.

14 Claims, 3 Drawing Sheets

METHOD OF SEISMIC SOURCE INDEPENDENT OPERATION

CROSS-REFERENCE TO RELATED APPLICATIONS

This application claims priority from U.S. Provisional Application Ser. No. 61/596,660 filed Feb. 8, 2012, the disclosure of which is incorporated herein by reference.

BACKGROUND OF THE DISCLOSURE

1. Field of the Disclosure

This disclosure relates generally to systems and methods that employ synchronization protocols to autonomously control seismic data acquisition activities.

2. Background of the Art

Seismic surveys are conducted to map subsurface structures to identify and develop oil and gas reservoirs. Seismic surveys are typically performed to estimate the location and quantities of oil and gas fields prior to developing (drilling wells) the fields and also to determine the changes in the reservoir over time subsequent to the drilling of wells. On land, seismic surveys are conducted by deploying an array of seismic sensors (also referred to as seismic receivers) over selected geographical regions. The seismic sensors (geophones or accelerometers) are placed or coupled to the ground in the form of a grid. An energy source is used at selected spaced apart locations in the geographical area to generate or induce acoustic waves or signals (also referred to as acoustic energy) into the subsurface. The acoustic waves generated into the subsurface reflect back to the surface from subsurface formation discontinuities, such as those formed by oil and gas reservoirs. The reflections are sensed or detected at the surface by the seismic sensors and recorded. The sensing, processing and recording of the seismic waves is referred to as seismic data acquisition. Two-dimensional and/or three-dimensional maps of the subsurface structures (also referred to as the "seismic image") are generated from the recorded seismic data. These maps are then used to make decisions about drilling locations, reservoir size, pay zone depth and estimates of the production of hydrocarbons.

The present disclosure provides communication protocols for facilitating seismic activity for obtaining seismic information.

SUMMARY OF THE DISCLOSURE

Aspects of the present disclosure include a seismic data acquisition system that may operate autonomously, and methods, systems and products for control and communications related to this system. The system may include energy sources that traverse a field and a controller that includes autonomous mode software. Each energy source may include a vibrator controller (decoder), a wireless communications system, a GPS Receiver, and autonomous mode firmware/software. The controller may include an information processing device programmed for autonomous mode command and quality control. The controller may communicate with a crew operating the energy sources, or may be connected locally to each decoder of each energy source. The controller may include an algorithm used to maintain minimum distances between the energy sources. The controller may also include an algorithm that tracks the location of all of the vibrators by the coordinate data which is present in Acknowledge and post sweep service (PSS) messages. The algorithm may order the list of source points so that the nearest source point can be easily found for each sweep that is performed.

System aspects may include a plurality of mobile seismic energy sources for providing acoustic energy to a formation, each source of the plurality of sources comprising a decoder controller; a wireless communications system coupled to the decoder controller; and a positioning system coupled to the decoder controller; and at least one encoder controller coupled to another wireless communications system. The encoder controller may be configured to: selectively send a first message to place the plurality of energy sources into an operating mode whereby each energy source traverses a selected geographical region while intermittently stopping to perform a sweep at one or more specific locations, the sweep comprising providing acoustic energy to the formation; and selectively send a second message to place at least one of the plurality of energy sources into a non-operating mode. The decoder controller of each of the plurality of sources may be configured to send a third message from at least one energy source to a controller in response to conclusion of a sweep.

The at least one encoder controller may be further configured to estimate a distance between at least two energy sources using third messages transmitted from each of the at least two energy sources; and may be further configured to send the second message to at least one of the at least two energy sources if the estimated distance is less than a specified value. At least one of the encoder controller and the decoder controller of each of the plurality of sources may be configured to autonomously traverse the corresponding selected geographical region using a list of known physical source points and/or configured to order the list of source points for sweeping by distance from a reference point outside the region. The plurality of energy sources may be switchable between a group operational state and a group non-operational state. Each of the plurality of energy sources is individually switchable between an individual operational state and an individual non-operational state; and the decoder controller of each of the plurality of energy sources may be further configured to function in operational mode when the plurality of energy sources is in the group operational state and the energy source is in the individual operational state.

Method aspects may include sending a first message to place a plurality of mobile energy sources into an operating mode whereby each energy source traverses a selected geographical region while intermittently stopping to perform a sweep at one or more specific locations, the sweep comprising providing acoustic energy to the formation; sending a second message to place at least one of plurality of energy sources into a non-operating mode; and sending a third message from at least one energy source to a controller in response to conclusion of a sweep.

Non-transitory machine-readable medium product aspects may include instructions thereon, that when executed by at least one processor, cause the processor to perform methods herein. For example, the product may include instructions for selectively sending a first message to place a plurality of mobile seismic energy sources for providing acoustic energy to a formation into an operating mode whereby each energy source traverses a selected geographical region while intermittently stopping to perform a sweep at one or more specific locations, the sweep comprising providing acoustic energy to the formation; selectively sending a second message to place at least one of the plurality of energy sources into a non-operating mode; and receiving a third message from at least one of the plurality of energy sources transmitted in response to conclusion of a sweep.

Examples of certain features of the systems, methods and apparatus disclosed herein have been summarized rather broadly in order that detailed description thereof that follows may be better understood, and in order that the contributions to the art may be appreciated. There are, of course, additional features of the disclosure that will be described hereinafter and will form the subject of the disclosure. The summary provided herein is not intended to limit the scope.

BRIEF DESCRIPTION OF THE DRAWINGS

The novel features of this disclosure, as well as the disclosure itself, will be best understood from the attached drawings, taken along with the following description, in which similar reference characters generally refer to similar elements, and in which.

DETAILED DESCRIPTION OF THE EMBODIMENTS

The present disclosure relates to devices and methods for controlling activities relating to seismic data acquisition. The present disclosure may be implemented in embodiments of different forms. The drawings shown and the descriptions provided herein correspond to certain specific embodiments of the present disclosure for the purposes of explanation of the concepts contained in the disclosure with the understanding that the present disclosure is to be considered an exemplification of the principles of the disclosure, and is not intended to limit the scope of the disclosure to the illustrated drawings and the description herein.

Figure 1:
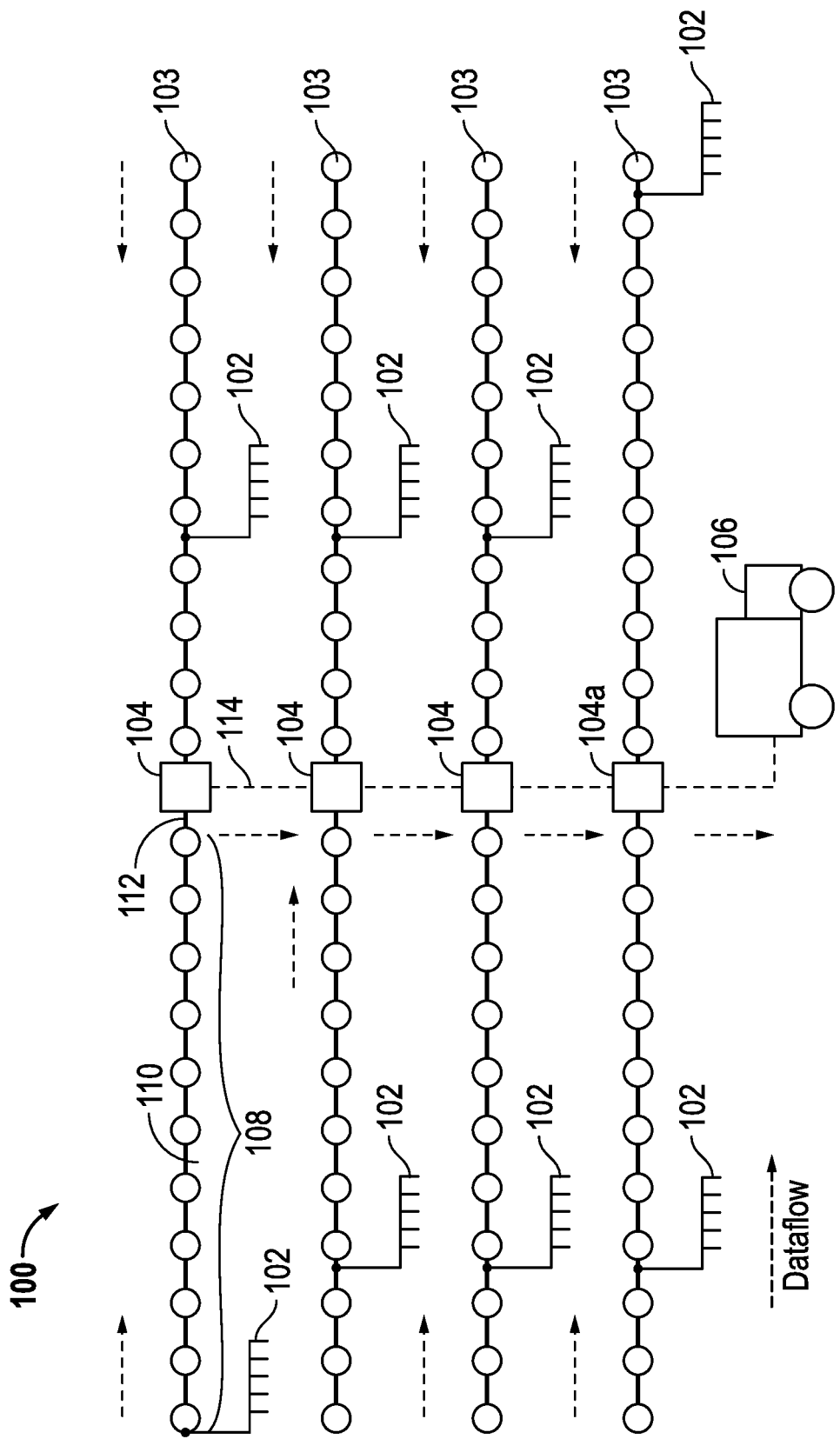
FIG. 1 shows a cable seismic data acquisition system that may utilize the disclosed communication protocols.
Figure 2:
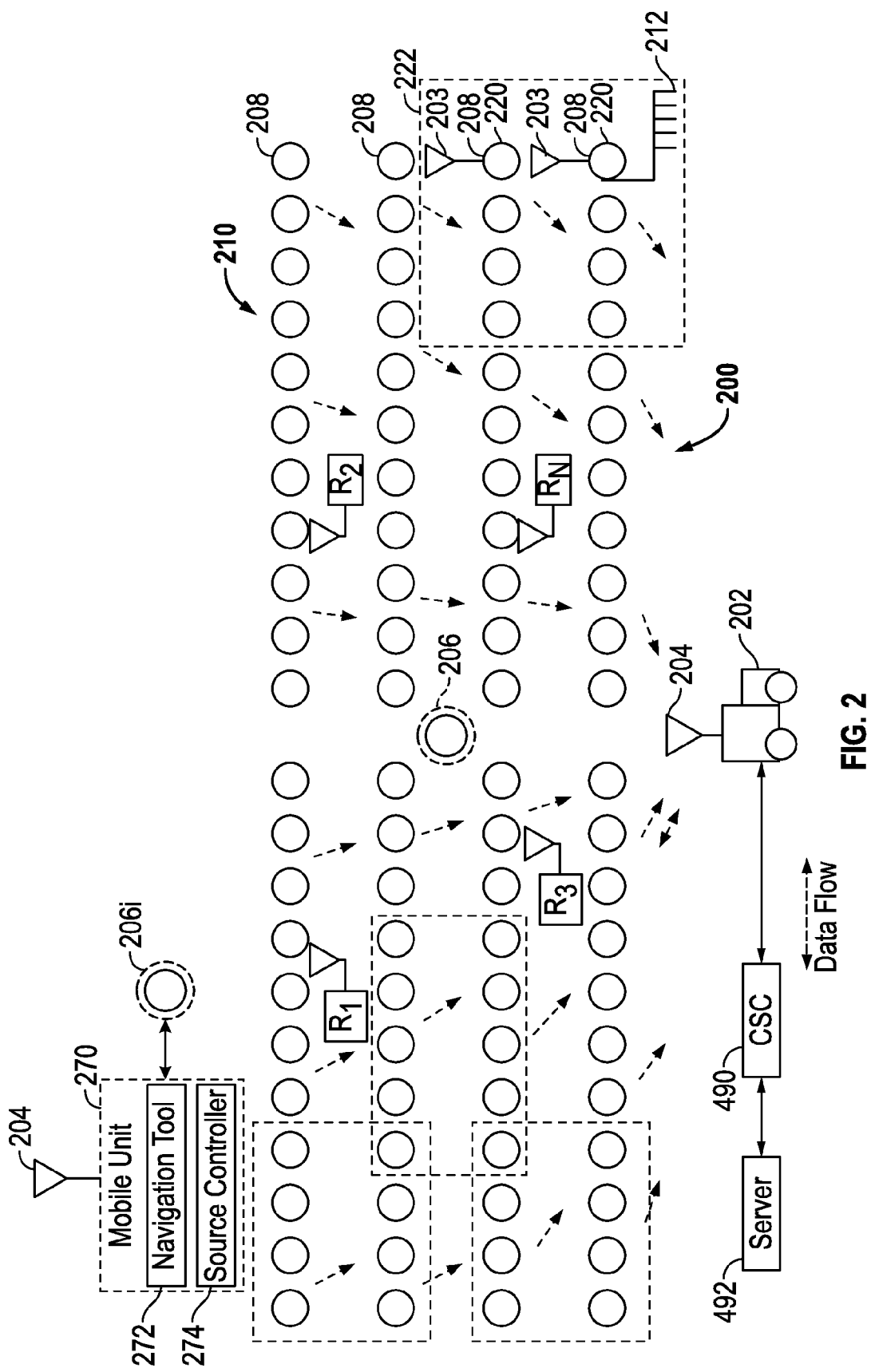
FIG. 2 is a representation of a wireless seismic data acquisition system that may use the disclosed communication protocols.

FIGS. 1 and 2 depict illustrative, but not exclusive, seismic data acquisition systems that may implement the methods of the present disclosure. The basic components of these systems are discussed in greater detail below. Thereafter, the methods for controlling/synchronizing communications for these systems are described FIG. 1 depicts a conventional cable seismic data acquisition system 100. Such a system includes an array (string) of spaced-apart seismic sensor units 102. Each string of sensors is typically coupled via cabling to a data acquisition device 103, and several of the data acquisition devices and associated string of sensors are coupled via cabling 110 to form a line 108, which is then coupled via cabling 112 to a line tap or (crossline unit) 104. Several crossline units 104 and associated lines are usually coupled together by cabling, such as shown by the dotted line 114. The sensors 102 are usually spaced between 10-50 meters. Each of the crossline units 104 typically performs some signal processing and then stores the processed signals as seismic information. The crossline units 104 are each typically coupled, either in parallel or in series, with one of the units 104a serving as an interface between the central controller or control unit (CU) 106 and all crossline units 104. This system may use wired communication media, e.g., RS232, Ethernet, RS485, USB, etc.

Referring to FIG. 2, a representation of a wireless seismic data acquisition system 200 is shown according to one embodiment of the present disclosure. The system 200 includes a central controller or control unit (CU) 202 in data communication with each of a number of wireless field station units (FSU) or sensor stations 208 forming an array (spread) 210 for seismic data acquisition. The wireless communication between the central controller 202 with the FSUs 108 may be direct bi-directional wireless communication or via an intermediate unit such as a repeater unit (RU) (not shown). Each sensor station 208 includes one or more sensors 212 for sensing seismic energy. The sensors 212 may be any suitable seismic sensors, including geophones, and one or more component accelerometers.

Direct communication as used herein refers to individualized data flow as depicted in FIG. 2 by dashed arrows. A wireless communication system can be a VHF, UHF, WiFi, or other wireless radio communication system. The data flow can be bi-directional to allow one or more of: transmission of command and control instructions from the central controller 202 to each wireless sensor station 208; exchange of quality control and other data between the central controller 202 and each wireless sensor station 208; and transmission of status signals, operating conditions and/or selected pre-processed seismic information from each wireless sensor station 208 to the central controller 202. The communication might be in the form of radio signals transmitted from and received by the sensor stations 208 and central controller 202 via suitable antennas 203 and 204 respectively.

In an active mode, the system 200 uses one or more seismic energy sources 206 to generate seismic energy of known characteristics, such as magnitude, frequency etc., at known locations in the seismic spread to impart seismic energy into the subterranean formation. A representative seismic energy source is designated with numeral 206i. Typically, activation (or more commonly, "shooting" or "firing") of the source 206i is initiated locally by a mobile unit 270.

One illustrative energy source is a vibrator truck. Vibrator trucks support a heavy base plate that is connected to an inertia mass. The inertia mass contains a linear actuator that reciprocates the base plate along a vertical or horizontal axis in reaction to the momentum of the inertia mass. The reciprocating base plate injects a vibratory wave train into the earth. A programmable controller controls the force and frequency of the signal generated by the inertia mass.

Another illustrative energy source is an accelerated weight-drop truck. A weight-drop truck is a vehicle mounted ground impact which can used to provide the seismic source. A heavy weight is raised by a hoist at the back of the truck and dropped, possibly about three meters, to impact (or "thump") the ground. To augment the signal, the weight may be dropped more than once at the same spot, the signal may also be increased by thumping at several nearby places in an array whose dimensions may be chosen to enhance the seismic signal by spatial filtering.

Still other illustrative energy sources include explosive sources, such as dynamite, and compressed gas source. It should be understood, however, that any device that generates usable seismic energy may be an energy source.

In one embodiment, an operator in the mobile unit 270 utilizes a navigation tool 272 to navigate to a selected source location and using a source controller 274 operates the vibrator associated with the mobile unit to impart seismic energy into the subterranean formation. In another aspect, a mobile unit may be used to controllably fire explosive sources. To navigate the terrain and to determine the precise location coordinates of the source, the navigation tool 272 can be equipped with a global positioning satellite (GPS) device and/or a database having predetermined coordinates for each of the locations at which the source is to be activated. The source controller 274 can be programmed to receive and transmit information such as instructions to make the source 206*i* ready for firing, fire the source 206*i*, provide data indicative of the location of the mobile unit 270, the arming status of the source 206*i*, and data such as return shot attributes.

The central controller 202, the central station computer (CSC) 260 and a central server 280 exert control over the constituent components of the system 200 and direct activities of the operators and devices during the operation of the system 200. The server 280 can be programmed to manage data and activities over the span of the seismic surveying activities, which can include daily shooting sequences, updating the shots acquired, tracking shooting assets, storing seismic data, pre-processing seismic data and broadcasting corrections. CSC 260 may be integral with the central controller 202. The central controller 202 also may act as a central radio unit. For large fields, radio antennas and repeater transceivers may also be deployed at selected field locations as described below.

As will be discussed in greater detail below, operating methods in accordance with the present disclosure allow all the energy sources (e.g. vibrators) in a crew operate independently of a central recording system and also to work independently of each other. As used herein, the term "encoder" refers to the recording system (e.g., controller 202 of FIG. 2) and the term "decoder" generally refers to a source (e.g., source 206 of FIG. 2).

Figure 3:
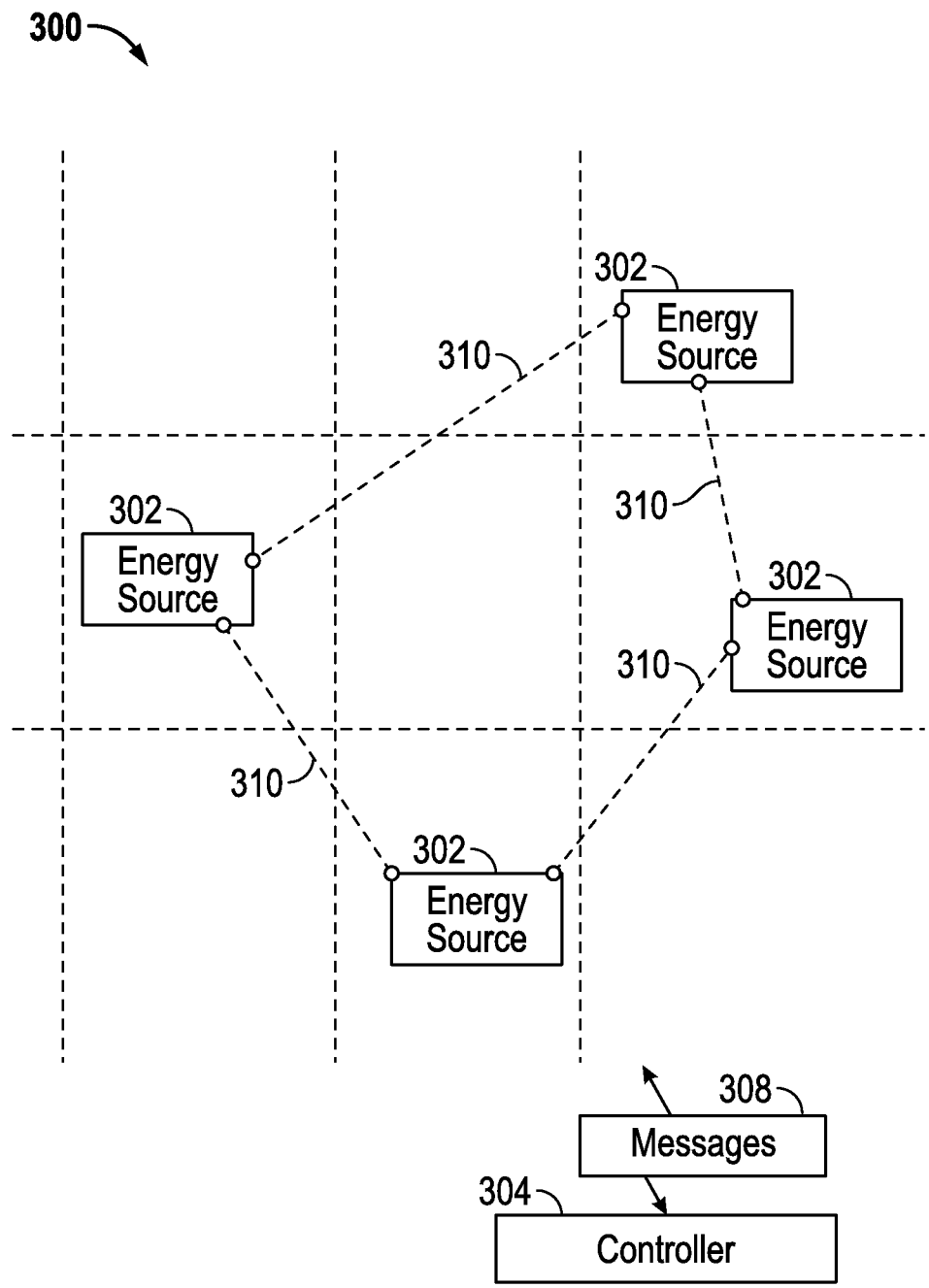
FIG. 3 shows a portion of an exemplary seismic data acquisition system according to one embodiment of the present disclosure.

Referring now to FIG. 3, there is shown a portion of a seismic data acquisition system 300 (which may be similar to those described above) that may operate autonomously. The system 300 may include energy sources 302 (e.g., vibroseis energy sources) and a controller 304. Each energy source 302 may include a vibrator controller (decoder), a wireless communications system, a GPS Receiver, and autonomous Mode firmware/software. It should be noted that any number of energy sources 302 may be deployed in the field. A "crew" of seismic energy sources may include any type of source previously described. The crew may be composed of one or more fleets. Each fleet may include one or more energy sources 302. The crew may also have one or more energy source encoders (e.g., controller 304). The encoder 304 may be used to implement communication and timing of events with the energy sources 302. Each encoder 304 may be connected to control software implemented in a suitable information processor, which is used to implement and coordinate the operations of the crew.

The controller 304 may include an information processing device programmed for autonomous mode command and quality control. The controller 304 implements autonomous mode operational rules and may be programmed with configuration parameters and a source performance and location data base. The controller 304 may be a laptop computer that hosts software and which can communicate with the crew operating the energy sources 302, or may be connected locally to each decoder.

Each energy source 302 functions independently. For example, when seismic operations are to be conducted, the vibrator of the energy source 302, as directed by its operator, traverses the prospect to be explored. It stops when required and performs one or more sweeps. After each sweep, a Post Sweep Service (PSS) message is stored. This PSS message contains the exact time when the sweep started, the location of the energy source 302 and a summary of the vibrator performance. The PSS message contains fields that uniquely identify the PSS message. This storage is distinct from any storage of similar data generated during non-autonomous operations.

While each sweep is performed, vibrator signature signal data may be acquired and made available to an external application to be recorded. GPS messages received and the PSS message for the sweep are also sent to the external recording application. In one arrangement, the vibrator decoder of each energy source 302 will receive, decode and respond to any autonomous operation messages addressed to it. In one scheme, there are four basic messages 308 which may be used to manage the crew for the energy source 302 in the autonomous mode: (i) red/green light command, which can be sent to the crew or individual units, (ii) acknowledge, which contains current status (e.g., red/green light), errors, location coordinates, ID of last sweep performed; (iii) post sweep service (PSS), which contains energy source performance data, exact time of the start of the sweep, the location of the vibrator, and (iv) PSS request, which can be sent to each vibrator.

Each vibrator decoder may automatically switch to the autonomous operation mode upon receipt of any autonomous operation message, whether directly addressed to it or not. As a safety or efficiency measure, the message may include a "crew number" that allows non-operating crew to ignore the message. In one embodiment, a "green light" means that seismic operations can commence and a "red light" means that seismic operations are to temporarily cease.

In autonomous operations, the entire crew has a state, either green or red light state. The individual vibrators also have a green or red light state. This is done so that individual vibrators can be commanded to halt due to various error conditions. In order for the individual vibrators to conduct vibroseis operations, the individual vibrator and the crew must both be in the green light state. As needed to suit user-defined conditions, autonomous operations of individual vibrators may be temporarily halted, automatically or manually, due to a variety of conditions, e.g., unacceptable GPS quality, too many data records to retrieve, invalid proximity to other vibrators, lack of regular radio communication, poor performance of the vibrator, poor environmental conditions (too much wind, too much other traffic, etc.).

If the central recording system (if present) ceases functioning, the operator can halt the crew operations until the recording system is running again. When in the autonomous mode, the vibrators are prevented from responding to commands which are used in non-autonomous mode operations. Also, when the decoders of the seismic sources 302 are not in the green light state, they are prevented from conducting sweeps, i.e., they cannot generate energy into the ground.

The controller 304 is used by the operator to first set the crew into the autonomous operations mode by sending out a red light message to the crew. Each vibrator returns an acknowledge message to the red light message. This acknowledge message contains ID of the responding unit, confirmation of the red light status of the vibrator, the quality of the GPS messages it is receiving, the coordinates of its location, and the ID of the last sweep that was performed in the autonomous mode. When ready, the operator can commence seismic operations by sending out a green light message to the crew. Each vibrator returns an acknowledge message to the green light message. This acknowledge message contains: ID of the responding unit, confirmation of the green light status of the vibrator (If the unit cannot change its status to green light, it will respond with the red light status), the quality of the GPS messages it is receiving, the coordinates of its location, and the ID of the last sweep which was performed in the autonomous mode.

The autonomous mode operations software of the controller 304 periodically interrogates all the decoders of the sources 302 in the crew for its status. Comparing each previous sweep ID received with the current sweep ID from the corresponding decoder, the program can determine how many PSS messages need to be acquired from the decoders. The software can then commence to requesting the PSS messages from each decoder. The software determines the optimum number of messages to request at a time and the order in which the decoders are requested.

In the course of these operations, some PSS messages may be missed, due to radio communication or other various issues. In response to this condition, the software keeps a list of PSS messages which were requested but have not yet been received. On a periodic basis, all other requests are suspended. The list of missing PSS messages is processed by re-requesting each PSS message which is listed as missing. If the PSS message is received in response to the request, it is removed from the missing list. A count of such requests is kept for each missing message. The count is incremented each time a request is made without a response being received. Once the count is exceeded, the message reference is removed from the list and is logged in a file.

The operational status of the crew (red or green light) and the individual vibrators (red or green light) may be displayed on a screen in the Graphic User Interface (GUI) of the controller 304. The operator may view the details of each vibrator status by the facilities provided by the GUI. The operator can attempt to force a change in the status of any individual vibrator using the GUI. There is periodic polling conducted of the vibrator units in the field. There is polling for: Current autonomous Status and Position, PSS messages, Missing PSS messages. In addition, the communication system may accommodate user generated commands, such as commands to change the status of individual vibrators, or the entire crew. By polling, it is meant that a source 304 is requested to confirm the existence of and/or transmit specified information.

The software of the controller 304 may function to regulate the communication traffic. Using suitable communication traffic techniques, the controller 304 may be aware of when the radios are busy with a transaction and when they are not. It prevents outstanding transactions from being interrupted with other transactions from occurring until the current transaction has completed.

The red/green light command message has the added effect of performing a vibrator position request, due to the position information that is included in the Acknowledge message. This Acknowledge message is returned in response to the red/green light message. In non-autonomous mode operations, there exists a "Master" PSS message, which is known in the industry as an "Encoder PSS" message. The data in this message is used to relate the vibrator PSS data to a known, surveyed, physical location in the prospect to be explored. This location is known as a "source point". According to the operational rules set by the client, a vibrator may be required to vibrate the ground at each source point one or more times. Each sweep that is generated at that source point is known as an "Energy Point", or "EP". The collection of one or more "EP"'s is known as a "Vibration Point" or "VP". The "Encoder PSS" messages are used to relate all the EP's to a VP number, which is related to a physical source point.

In autonomous operations, the Encoder PSS may not be present. However, the list of all the physical source points is known before the seismic operations start. This list of source points is loaded into the software. The software constantly tracks the location of all the vibrators by the coordinate data which is present in the Acknowledge and the PSS messages. The software uses an algorithm to order the list of source points so that the nearest source point can be easily found for each sweep that is performed.

By tracking the location of the vibrators and the nearest source point, the software can determine when a VP begins (with the first EP) and it can determine when the VP ends (with the last EP). The software can then generate a synthetic Encoder PSS message for every sweep that every vibrator performs. This operation facilitates the storage of all the performance data for the crew and the generation of contractually require reports based upon this data.

One exemplary algorithm for ordering the source points allows a binary search to be performed on the coordinate data which consists of latitude, longitude and elevation. The list of source points can be in the tens of thousands or hundreds of thousands. Given such large lists, it may be desirable to locate the nearest source point with a minimum use of the available computing resources. The exemplary algorithm may include the following steps:

To order the list, the following operations are performed: (i) find the four corners (NE, NW, SE, SW) of the list, (ii) generate a point that is to the NW which is outside the box defined by the four corners. This is the "List Reference Point," (iii) determine the distance between each source point and the List Reference Point. This is the "Reference Distance," and (iv) sort the list of source points by the Reference Distance, When the closest source point must be found, the following operations are performed: (i) use the new coordinates to calculate a new Reference Distance, (ii) using the new Reference Distance, perform a binary search on the sorted source point list to find the set of the source points which are nearest in value to the new Reference Distance, (iii) find the bounds of this subset list by adjusting the new Reference Distance (+and –) and traversing the list from the point indicated by the binary search. This traversal will proceed forwards and backwards from the starting point. It will end when the source point Reference Distances are outside the adjusted Reference Distance, and (iv) finally the actual distance between the new coordinates and the source coordinates of each source point in the subset list. The smallest distance calculated is the nearest source point.

Another algorithm may be used to maintain minimum distances between the energy sources 302. Several distances between the sources 302 are shown on FIG. 3 with lines 310. It may desirable to ensure that no two sources 302 operate at a distance closer than a user specified value. An illustrative algorithm may use the messages received from the sources 302 to retrieve location information for each of the sources 302. From the location information, the distances between each of the sources 302 may be determined. The controller 304 may automatically, or through human prompting, transmit a red light message to one or more sources 302 that temporarily halt seismic operations. The controller 304 may be used to send a green light message to those sources 302 once a minimum distance has been re-established.

The above signal communications may be done wirelessly and/or with hardwires. The communication protocol may consist of an analog or digital protocol or method of synchronization.

The term "seismic devices" means any device that is used in a seismic spread, including, but not limited to sensors, sensor stations, receivers, transmitters, power supplies, control units, etc. The disclosure herein is provided in reference to particular embodiments and processes to illustrate the concepts and methods. Such particular embodiments and processes are not intended to limit the scope of the disclosure or the claims. All such modifications within the scope of the claims and disclaimers are intended to be part of this disclosure.

What is claimed is:

1. A system for performing autonomous seismic survey of a formation, comprising:
a plurality of mobile seismic energy sources on land for providing acoustic energy to a formation, wherein the plurality of energy sources is switchable between a group operational state and a group non-operational state, each of the plurality of energy sources is individually switchable between an individual operational state and an individual non-operational state, and each source of the plurality of sources comprising:
a decoder controller, wherein the decoder controller is configured to (i) autonomously traverse a selected geographical region using a list of known physical sources points, and (ii) function in operating mode when the plurality of energy sources is in the group operational state and the energy source is in the individual operational state;
a wireless communications system coupled to the decoder controller; and
a positioning system coupled to the decoder controller; and
at least one encoder controller coupled to another wireless communications system, the encoder controller configured to:
selectively send an autonomous mode message to at least one energy source of the plurality of energy sources to place the at least one energy source into an autonomous mode that prevents the at least one energy source from responding to non-autonomous commands from the at least one encoder controller and places the at least one energy source into a non-operating mode that prevents the at least one energy source from performing a seismic sweep;
selectively send an operating mode message to the at least one energy source to place the at least one energy source into an operating mode whereby the at least one energy source autonomously traverses the selected geographical region while intermittently stopping to perform a seismic sweep at one or more specific locations of the known physical source points, the seismic sweep comprising applying acoustic energy to the formation; and
selectively send a non-operating mode message to the at least one energy source to place the at least one energy source into the non-operating mode that prevents the at least one energy source from performing the seismic sweep; and
wherein the decoder controller of each of the plurality of sources is configured to:
send a acknowledge message from the at least one energy source to the at least one encoder in response to at least one of: the autonomous mode message, the operating mode message, and the non-operating mode message; wherein the acknowledge message includes at least one of: an identifier of the at least one energy source, a quality value of positioning system messages, an energy source operating mode status, an energy source error status, coordinates of the at least one energy source location, an identifier of the latest sweep performed by the energy source, and energy source performance data; and
send a post sweep service message from the at least one energy source to the at least one encoder controller in response to at least one of (i) a conclusion of a seismic sweep and (ii) a post sweep service request message from the at least one encoder controller; wherein the post sweep service message includes at least one of: the identifier of the at least one energy source, the energy source operating mode status, the energy source error status, the energy source location coordinates, the identifier of the latest sweep performed by the energy source, energy source performance data, start time of the latest sweep performed by the energy source, and the location of the latest sweep performed by the energy source,
wherein the encoder controller is further configured to determine whether to send the non-operating mode message to the at least one energy source using at least one of the post sweep service messages from the plurality of sources and the acknowledge messages from the plurality of sources.

2. The system of claim 1, wherein the at least one encoder controller is further configured to estimate a distance between at least two energy sources using the post sweep service messages transmitted from each of the at least two energy sources.

3. The system of claim 2, wherein the at least one encoder controller is further configured to send the non-operating mode message to at least one of the at least two energy sources if the estimated distance is less than a specified value.

4. The system of claim 1, wherein the encoder controller is further configured to estimate a distance between each of the energy sources and a reference point, and use the estimated distance to find a source point.

5. The system of claim 1, wherein at least one encoder controller is configured to autonomously traverse the corresponding selected geographical region using the list of known physical source points.

6. The system of claim 5, wherein at least one of the encoder controller and the decoder controller of each of the plurality of sources is configured to order the list of source points for sweeping by distance from a reference point outside the region.

7. A method for controlling seismic data acquisition communication, comprising:
sending an autonomous mode message from the least one encoder controller to at least one energy source of a plurality of mobile seismic energy sources to place the at least one energy source into an autonomous mode that prevents the at least one energy source form responding to non-autonomous commands from the at least one encoder controller and places the at least one energy source into a non-operating mode that prevents the at least one energy source from performing a seismic sweep;
sending an operating mode message from the at least one encoder controller to the at least one energy source to place the at least one energy source into an operating mode whereby the at least one energy source traverses a selected geographical region while intermittently stopping to perform a seismic sweep at one or more specific locations using a list of known physical source points, the sweep comprising applying acoustic energy to the formation;
sending a non-operating mode message from the at least one encoder controller to the at least one energy source to place the at least one energy source into the non-operating mode that prevents the at least one energy source from performing the seismic sweep;

sending an acknowledge message from the at least one energy source to the at least one encoder controller in response to receiving at least one of: the autonomous mode message, the operating mode message, and the non-operating mode message; wherein the acknowledge message includes at least one of: an identifier of the least one energy source, a quality source of positioning system message, an energy source operating mode status, an energy source error status, coordinates of the at least one energy source location, an identifier of the latest sweep performed by the energy source, and energy source performance data; and sending a post sweep service message from the at least one energy source to the at least one encoder controller in response to at least one of (i) a conclusion of a seismic sweep and (ii) a post sweep service request message from the at least one encoder controller; wherein the post sweep service message includes at least one of: the identifier of the least one energy source, a quality value of positioning system messages, an energy source operating mode status, an energy source error status, coordinates of the at least one energy source location, an identifier of the latest sweep performed by the at least one energy source, energy source performance data, start time of the latest sweep performed by the at least one energy source, and the location of the latest sweep performed by the at least one energy source;

wherein the at least one encoder controller determines whether to send the operating mode message to the at least one energy source using at least one of: (i) post sweep service messages from the plurality of energy sources and (ii) acknowledge messages from the plurality of energy sources;

wherein the plurality of energy sources is switchable between a group operational state and a group non-operational state;

wherein each of the plurality of energy sources is individually switchable between an individual operational state and an individual non-operational state; and wherein the at least one energy source enters the operating mode only if the plurality of energy sources is in the group operational state and the at least energy source is in the individual operational state.

8. The method of claim 7, further comprising using the at least one encoder controller to estimate a distance between at least two energy sources of the plurality of energy sources using post sweep service messages from the at least two energy sources.

9. The method of claim 8, further comprising sending the non-operating mode message to at least one of the at least two energy sources if the estimated distance is less than a specified value.

10. The method of claim 9, further comprising sending the operating mode message to the at least one of the at least two energy sources to return the at least one of the at least two energy sources to the operating mode if the estimated distance returns to a value greater than the specified value.

11. The method of claim 7, further comprising estimating a distance between each of the energy sources and a reference point, and using the estimated distance to find a source point.

12. A non-transitory machine-readable medium product with instructions thereon, that when executed by at least one processor, causes the processor to perform a method for performing an autonomous seismic survey of a formation, comprising:

selectively sending an autonomous mode message from at least one encoder controller to at least one energy source of a plurality of mobile seismic energy sources to place the at least one energy source into an autonomous mode that prevents the at least one energy source form responding to non-autonomous commands from the at least one encoder controller and places the at least one energy source into a non-operating mode that prevents the at least one energy source from performing a seismic sweep;

selectively sending an operating mode message from the at least one encoder controller to the at least one energy source to place the at least one encoder into an operating mode whereby the at least one energy source traverses a selected geographical region while intermittently stopping to perform a seismic sweep at one or more specific locations, the seismic sweep comprising applying acoustic energy to the formation;

selectively sending a non-operating mode message from the at least one encoder controller to the at least one energy source to place the at least one energy source into the non-operating mode that prevents the at least one energy source from performing the seismic sweep;

selectively sending an acknowledge message from the at least one energy source to the at least one encoder controller in response to receiving at least one of: the autonomous mode message, the operating mode message, and the non-operating mode message; wherein the acknowledge message includes at least one of: an identifier of the at least one energy source, a quality value of positioning system messages, an energy source operating mode status, an energy source error status, coordinates of the at least one energy source location, an identifier of the latest sweep performed by the energy source, and energy source performance data; and selectively sending a post sweep service message from the at least one energy source to the at least one encoder controller in response to at least one of (i) a conclusion of a seismic sweep and (ii) a post sweep service request message from the at least one encoder controller; wherein the post sweep service message includes at least one of: the identifier of the least one energy source, a quality value of positioning system messages, an energy source operating mode status, an energy source error status, coordinates of the at lest one energy source location, an identifier of the latest sweep performed by the at least one energy source, energy source performance data, start time of the latest sweep performed by the least one energy source, and the location of the latest sweep performed by least one energy source;

wherein the at least one encoder controller determined whether to send the operating mode message to the at least one energy source using at least one of: (i) post sweep service messages from the plurality of energy sources and (ii) acknowledge messages from the plurality of energy sources;

wherein the plurality of energy sources is switchable between a group operational state and a group non-operational state;

wherein each of the plurality of energy sources is individually switchable between an individual operational state and an individual non-operational sate; and wherein the least one energy source enters the operating mode only if the plurality of energy sources is in the group operational state and the at least energy source is in the individual operational state.

13. The product of claim 12, further comprising instructions for using the at least one encoder controller to estimate a distance between at least two energy sources of the plurality of energy sources using post sweep service messages from the at least two energy sources.

14. The product of claim 13, further comprising instructions for sending the non-operating mode message to at least one of the at least two energy sources if the estimated distance is less than a specified value.

* * * * *